A. LEIBNER.
CAR SAFETY FENDER.
APPLICATION FILED NOV. 7, 1916.
1,227,458.
Patented May 22, 1917.
2 SHEETS—SHEET 2.
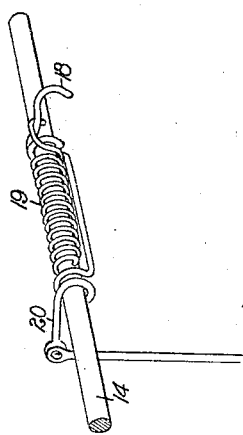
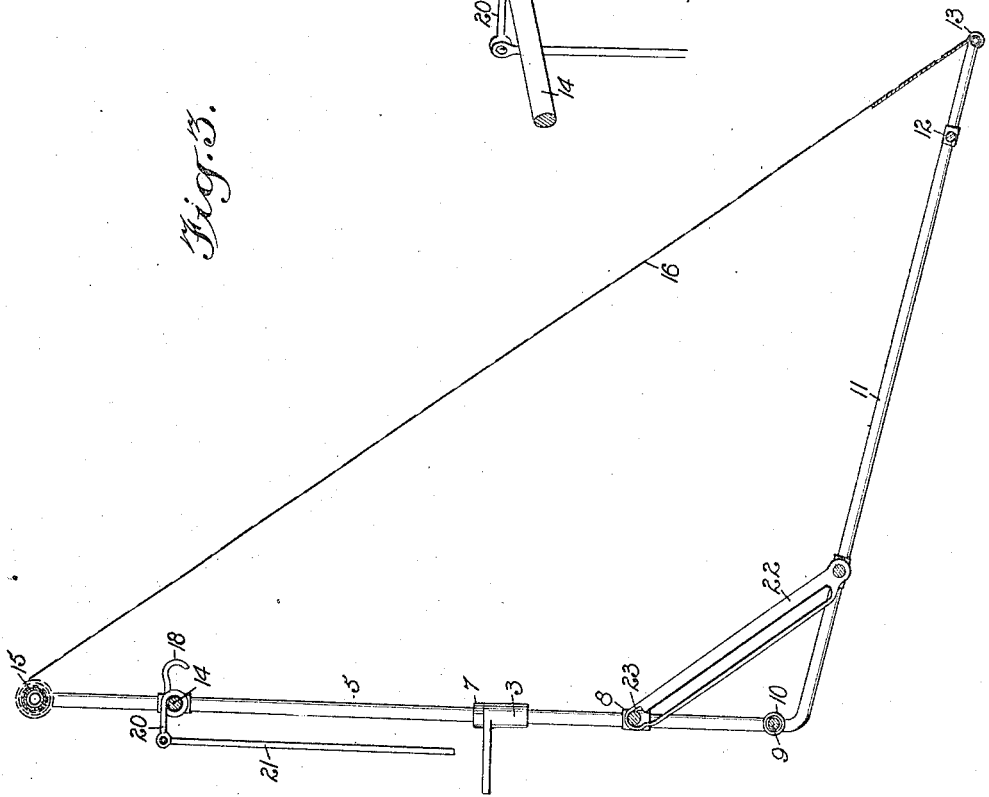
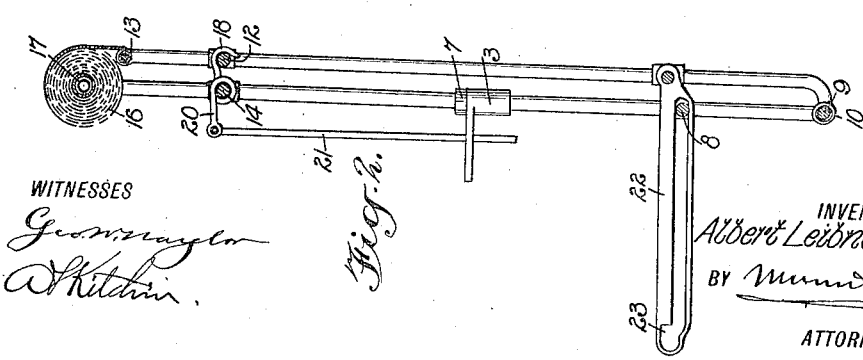
WITNESSES
INVENTOR
Albert Leibner
BY
ATTORNEYS

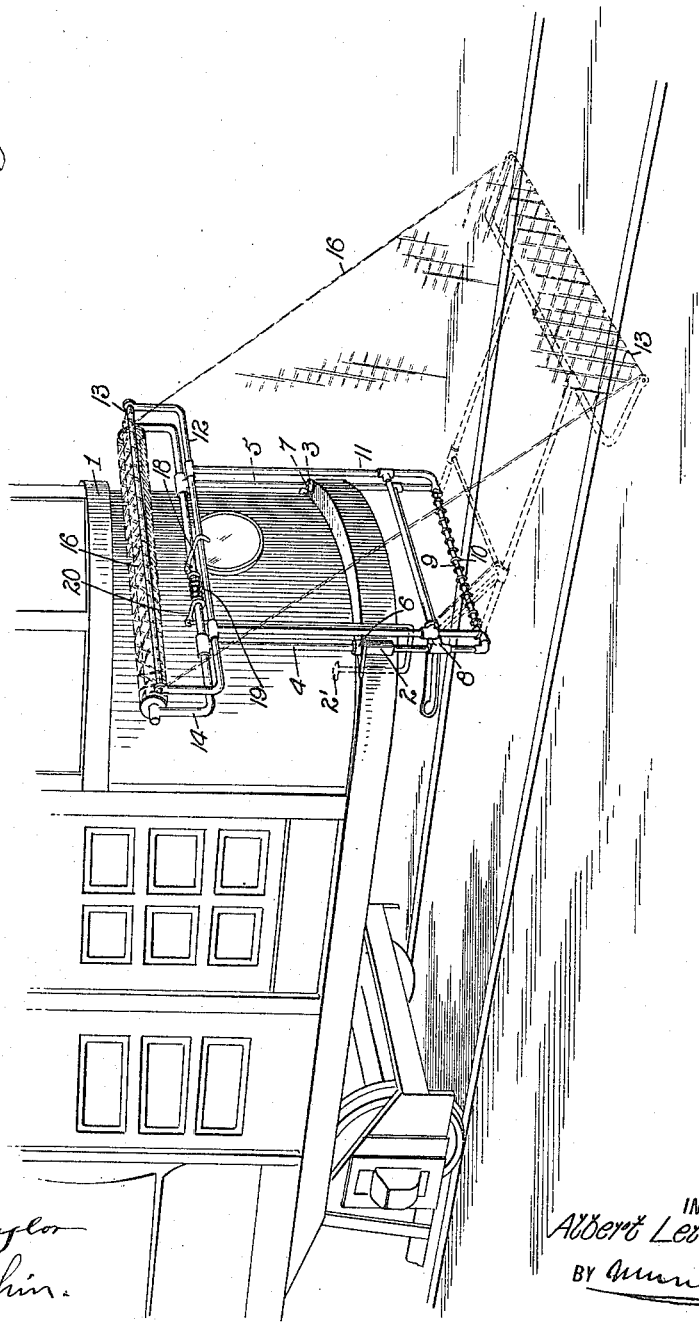

UNITED STATES PATENT OFFICE.

ALBERT LEIBNER, OF NEW YORK, N. Y.

CAR SAFETY-FENDER.

1,227,458.　　　　　　Specification of Letters Patent.　　Patented May 22, 1917.

Application filed November 7, 1916.　Serial No. 129,990.

*To all whom it may concern:*

Be it known that I, ALBERT LEIBNER, a citizen of the United States, and a resident of the city of New York, borough of Manhattan, in the county and State of New York, have invented a new and Improved Car Safety-Fender, of which the following is a full, clear, and exact description.

This invention relates to safety devices and particularly to car fenders, and has for an object the provision of an improved fender especially adapted for street cars which is normally moved to a raised position out of the way but which may be quickly lowered in case of an accident.

Another object in view is to provide a fender which will fold up but is capable of release and quick movement to a full open position.

A still further object in view is to provide a fender for cars having a foldable or collapsing fender screen and means for holding the screen or sheet in an unfolded position while allowing a limited yielding action.

In the accompanying drawings:

Figure 1 is a perspective view of part of one end of a car with a fender embodying the invention shown applied thereto.

Fig. 2 is a transverse sectional view through the fender shown in Fig. 1.

Fig. 3 is a view similar to Fig. 2 but showing the parts in their unfolded or operative position.

Fig. 4 is an enlarged detail fragmentary perspective view of a hook and associated parts embodying certain features of the invention.

Referring to the accompanying drawings by numerals, 1 indicates a car of any desired description to which the device is to be secured, the same being connected to the car, for instance, by brackets 2 and 3, said brackets being bolted or secured to the car in any suitable way. Each of the brackets just mentioned is provided with a hollow sleeve through which the uprights or bars 4 and 5 extend, said bars or uprights being provided with stops 6 and 7 for limiting the downward movement of the uprights. The uprights 4 and 5 are connected to a bracing cross bar 8 a short distance above the bottom and to a bottom cross bar 9 at the bottom, said last mentioned cross bar having a spring 10 surrounding the same, said spring being secured at one end to the cross bar 9 and at the other to part of the frame 11. The frame 11 is made up of bars which are pivotally mounted on cross bar 9 at the lower end, and a U-shaped bar 12 at the upper end, the arms of the U being connected by a cable 13 formed of ordinary rope or, if preferred, some other form of strong material. The use of the cable at this point is desirable, as when the parts are in the lowered position as shown in dotted lines in Fig. 1 the cable is at the point where the body of the person striking the device will first engage. The cable being of somewhat yielding nature will reduce the blow to an appreciable extent and in that way will prevent the breakage of any bones.

Associated with the frame 11 is a fixed frame comprising the bars 8 and 9 and uprights 4 and 5 and a U-shaped support 14. The support 14 carries a roller 15 on which the net or apron 16 is normally rolled. The roller 15 is provided with a retractile spring 17 wound therein so that when frame 11 is forced to its folded position, as shown in full lines in Fig. 1, the spring 17 will cause the roller 15 to rotate and wind the net 16 thereon. The spring 17 is not as strong as spring 10 and consequently when the frame 11 is released the spring 10 will quickly force the frame 11 and associated parts to the position shown in dotted lines in Fig. 1. In order to prevent this action under normal circumstances, a hook 18 is provided which engages the U-shaped member 12, said hook member being connected with a coiled spring 19, which coiled spring normally holds the hook member in a proper position but which may be moved by the lever 20 to a disengaged position upon the downward movement of the foot member 21. The foot member 21 is guided by proper guiding means and has one end connected with lever 20 so that when pressed downwardly the hook 18 will be raised upwardly against the action of spring 19.

In operation, when the parts are in the position shown in Fig. 1 and it is desired to use the device the motorman places his foot on member 21 and hook 18 is immediately moved upwardly so that frame 11 is released. Spring 10 acting on frame 11 will immediately throw the frame downwardly to the dotted position shown in Fig. 1 and will cause the net 16 to unwind. As the frame 11 moves downwardly the same carries with it one or more locking members 22 which are pivotally mounted upon frame 11 and have a notched portion 23 for engaging the bar 8 when the parts are in their lowered position. This notched portion 23 will prevent the accidental folding of frame 11 when a person strikes the net 16. However, the notch 23 is of a sufficient size to allow the frame 11 to move upwardly a short distance and thereby produce a giving or yielding action when a person is caught by the net. It will be observed that the lever 20 is connected to or formed integral with the hook 18 so as to move therewith, while spring 19 acts continually on hook 18 to hold the same in a lowered position. When it is desired to again fold the device to the position shown in Fig. 1 the locking member 22 is swung slightly upwardly and then the frame 11 is raised, the upward movement of locking member 22 allowing the upper part of the locking member to pass the bar 8 and assume the position shown in Figs. 1 and 2. When the frame 11 has moved to its extreme upper position the lock 18 will snap over the U-shaped member 12 and the parts are then in their locked folded position.

What I claim is:

1. A fender for cars comprising a fixed section designed to be secured to the car, a movable section pivotally connected with the lower part of the fixed section, a net having one end connected with the movable section and the opposite end with the fixed section, means for holding the movable section in a folded position, means for holding the movable section in an open position, and a flexible member for connecting the net with the movable section, said flexible member acting as a bumper when the fender strikes an object.

2. In a fender of the character described, a fixed fender arranged in vertical position, a movable fender hinged to the lower part of the fixed fender, a hook for normally holding the movable fender folded against the fixed fender, a spring for forcing the movable fender downwardly to an open position when the hook has been released, and a net connected at one end to the fixed fender and the opposite end to the movable fender, whereby when the movable fender is moved down to an open position the net will be spread ready for receiving the object struck.

3. A fender for cars comprising a fixed frame having a pair of uprights, a lower cross bar and an upper substantially U-shaped cross bar, sleeves fitting around the uprights for connecting the uprights with a car, a movable frame arranged on the lower cross bar, a roller mounted on said U-shaped upper bar, a net connected to said roller and to said movable frame, and means for normally holding the movable frame in a foldable position against the fixed frame.

4. A fender for cars comprising a fixed frame formed with a pair of uprights normally vertically positioned, a horizontal lower cross bar and a horizontal upper cross bar, the upper cross bar being formed with upstanding ends, a spring-actuated roller mounted on said ends, a movable frame pivotally mounted on the lower cross bar of the fixed frame, said movable frame having a transverse upper bar, a net secured to said roller and to said transverse upper bar whereby when the movable frame is swung down to the lowered position the net will be unwound from said roller and the spring in the roller will be brought under tension for causing a rewinding of the net when the movable frame is brought back to its first position, means for normally holding the movable frame adjacent the fixed frame, and a spring for quickly moving the movable frame when released.

5. A fender comprising a fixed upright frame, a movable frame hinged at the lower part of the upright frame, a hook for normally holding the upper part of the movable frame adjacent the upper part of the fixed frame, a roller arranged on the fixed frame, a net normally wound on said roller, said net having one end connected to the roller and the opposite end connected to the upper part of the movable frame, a spring for moving the movable frame downwardly and unwinding said net, and a pivotally mounted locking member carried by the movable frame for engaging the fixed frame for locking the movable frame in its lowered position when moved to such position.

6. A fender comprising a fixed member, a pivotally mounted member, a net or article-receiving screen having one end connected to the fixed member and one to the movable member, a spring for moving the movable member to an open position and stretching the net or screen, and a locking member for holding the movable member in its open position, said locking member comprising a pivotally mounted bar having a notch arranged to engage a stop and a guide for preventing the bar from accidentally moving away from said stop.

ALBERT LEIBNER.